Oct. 15, 1929.  P. E. WICKSTROM  1,731,958
JOURNAL BEARING
Filed May 16, 1927
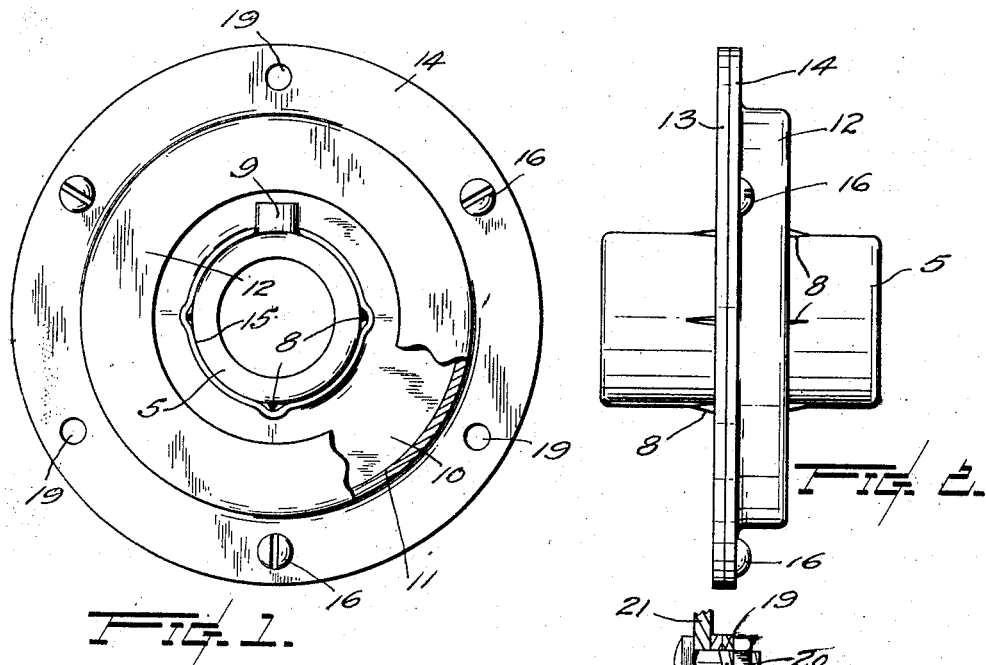
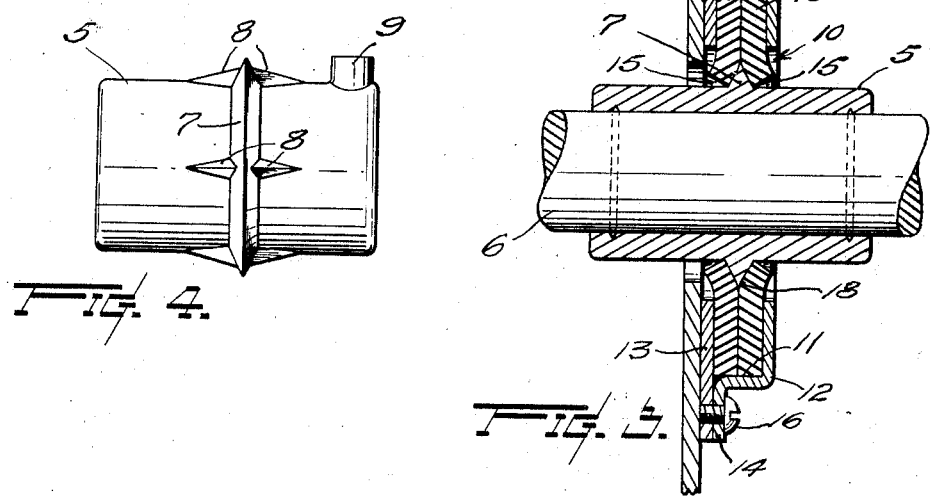
INVENTOR.
Paul E. Wickstrom
BY
ATTORNEY.

Patented Oct. 15, 1929

1,731,958

UNITED STATES PATENT OFFICE

PAUL E. WICKSTROM, OF SEATTLE, WASHINGTON, ASSIGNOR OF ONE-HALF TO CHARLES C. BATESON, OF SEATTLE, WASHINGTON

JOURNAL BEARING

Application filed May 16, 1927. Serial No. 191,657.

This invention relates to shaft-journal boxes, and more especially to improved devices for supporting the boxes of high speed shafts.

The object of my invention is to provide a journal box supporting device having resilient characteristics to accommodate vibratory impulses of the shaft to relieve the same of excessive stresses and also serve to obviate shocks and noises.

The invention consists in certain novel features of construction and combination of parts as will be hereinafter described and claimed.

In the accompanying drawings,—

Figure 1 is an end elevation of journal-bearing devices embodying my invention, a portion of the casing being broken away to more fully show the flexible box-supporting member; Fig. 2 is a side elevation of Fig. 1; Fig. 3 is a longitudinal section of the same, including a support and part of a shaft; and Fig. 4 is a detached side elevation of the journal-box shown in the preceding views.

The box 5, preferably a metal casting, is of a general tubular form which is cored out or internally babbitted to fit the journal of a shaft 6. Intermediate its length said box is provided circumferentially with a rib 7, preferably of a triangular shape in transverse section. As shown, said rib is buttressed at opposite sides by protuberances 8 (Fig. 4) whose main function will be described hereinafter.

The box 5, as illustrated in Figs. 1 and 4, is provided with a boss 9 for attaching a cup (not shown) for grease or other lubricant.

Surrounding the box 5 is an annular box-supporting member 10, of rubber or other elastic material, having in its inner periphery a groove 18 to receive the rib element of the box. For convenience of assembling the parts said member is desirably formed of two complementary elements $10^1$ as represented in Fig. 3.

The member 10 fits within a circular cavity 11 provided in a member 12 of a casing having a second member 13, herein illustrated as a plane annular plate fitting against a peripheral flange 14 of the recessed member 12.

The casing members 12 and 13 are provided centrally thereof with circular openings 15 of a diameter greater than the external diameter of the box rib 7. Said casing members are secured rigidly together as by means of screw threaded coupling bolts 16 passing through holes in the flange 14 of one member and engaging screw threads provided in holes of the other member. By thus clamping the casing members together the latter serve to hold the elastic sheets $10^1$ in operative relation with each other, causing the opposing outer portions of the sheets to be in contact with each other and the inner peripheral portions of the sheets to bear against opposite sides of the rib all around the box.

By thus regulating the sheets $10^1$, their inner peripheral portions are flexed outwardly—that is to say, toward the adjacent ends of the box—thereby providing the rib receiving groove 18 above referred to.

The box 5 is coupled against independent axial movement with respect to the member 10 by means of the rib-and-groove connection therebetween; and against independent rotary movement by reason of the protuberances 8 being embedded in the member 10 as represented in Fig. 1.

The amount of flexure permitting axial and radial movements of the box depends upon two factors; first, the exposed range or area surrounding the box and within the inner periphery of the casing; and, second, to the thickness and the yieldable quality of the material of which the member 10 is composed.

There is no looseness between the box and the resilient member, nor between the latter and the casing in which its outer circular portion is housed. Furthermore, the inner circular portion of the resilient member prevents the metal box and the metal casing 12—13 from contacting with each other.

The casing 12—13 may be secured to any suitable structure as, for example, a plate 21 (Fig. 3) by means of securing bolts 20 engaging in holes 19 provided therefor in the casing parts 12 and 13.

The nature of the invention and its mode of operation will, it is thought, be understood from the foregoing description of the now preferred embodiment.

What I claim, is,—

1. The combination with a journal-box having a circumferential rib element, and a two-part casing having an opening extending therethrough, said opening having a diameter greater than the diameter of said journal box, of a resilient member composed of two unserrated annular shaped pieces of sheet rubber affording in its inner periphery a groove to receive said rib element, the outer circular portion of said resilient member being secured in juxtaposed relation with each other between the parts of said casing.

2. In combination, a casing having an opening extending therethrough, a journal-box extending through the opening of the casing, said journal-box being provided intermediate its length with a peripheral rib having thereon protuberances disposed in spaced apart relations circumferentially of the journal-box, a pair of annular sheet rubber journal-box supporting elements surmounting the latter within the casing to form an interstice between the inner portions thereof, the outer circular portions of said elements being juxtaposed with each other, said interstice between the elements serving to receive said rib and the protuberances thereof for engaging the same to afford limited axial and radial movements of the journal-box subject to the flexibility and elasticity of the rubber elements.

Signed at Seattle, Washington, this 20th day of April, 1927.

PAUL E. WICKSTROM.